(12) United States Patent
Landau (10) Patent No.: US 10,372,788 B2
(45) Date of Patent: Aug. 6, 2019

(54) E-READER TO HELP USERS WITH DYSLEXIA BY PROVIDING ENHANCEMENT FEATURES INCLUDING MOVING SENTENCES WITHIN A PARAGRAPH AWAY FROM AN EDGE OF A PAGE

(71) Applicant: RAKUTEN KOBO INC., Toronto (CA)

(72) Inventor: Benjamin Landau, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 620 days.

(21) Appl. No.: 14/170,046

(22) Filed: Jan. 31, 2014

(65) Prior Publication Data
US 2015/0220503 A1 Aug. 6, 2015

(51) Int. Cl.
| | | |
|---|---|---|
| G06F 17/00 | (2019.01) | |
| G06F 17/21 | (2006.01) | |
| G09B 17/00 | (2006.01) | |
| G06F 15/02 | (2006.01) | |

(52) U.S. Cl.
CPC ........ *G06F 17/211* (2013.01); *G06F 15/0291* (2013.01); *G09B 17/00* (2013.01); *G09B 17/003* (2013.01)

(58) Field of Classification Search
CPC ....... G09B 17/04; G09B 17/00; G09F 17/211; G06F 15/0291
See application file for complete search history.

(56) References Cited

U.S. PATENT DOCUMENTS

| | | | | |
|---|---|---|---|---|
| 5,920,877 A * | 7/1999 | Kolster | ................. | G06F 1/1616 715/235 |
| 2004/0253568 A1* | 12/2004 | Shaver-Troup | ........ | G09B 17/00 434/178 |
| 2005/0125715 A1* | 6/2005 | Di Franco | ............. | G06F 17/243 715/226 |

OTHER PUBLICATIONS

Ebook reader NPL, Jul. 6, 2012, all pages.*
UX Movement NPL Jan. 23, 2011.*
Microsoft Word Application 2010 Copyright screen dumps.*

* cited by examiner

*Primary Examiner* — Cesar B Paula
*Assistant Examiner* — Benjamin J Norris
(74) *Attorney, Agent, or Firm* — Oblon, McClelland, Maier & Neustadt, L.L.P.

(57) ABSTRACT

A computing device provides a dyslexic enhancement mode. The dyslexic enhancement mode includes multiple dyslexic enhancement features that adjust the text content to facilitate ability of the user with dyslexia to read the text content. Additionally, the computing device provides an interface to enable the user to enter input to select and I specify values for individual dyslexic enhancement features. The computing device can configure implementation of the dyslexic enhancement mode based on the input provided by the user.

15 Claims, 5 Drawing Sheets

E-READER TO HELP USERS WITH DYSLEXIA BY PROVIDING ENHANCEMENT FEATURES INCLUDING MOVING SENTENCES WITHIN A PARAGRAPH AWAY FROM AN EDGE OF A PAGE

TECHNICAL FIELD

Examples described herein pertain to a computing device that provides an enhancement mode for users with reading disabilities.

BACKGROUND

An electronic personal display is a mobile electronic device that displays information to a user. While an electronic personal display may be capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

An electronic reader, also known as an e-reader, is an electronic personal display that is used for reading electronic books (eBooks), electronic magazines, and other digital content. For example, digital content of an eBook is displayed as alphanumeric characters and/or graphic images on a display of an e-reader such that a user may read the digital content much in the same way as reading the analog content of a printed page in a paper-based book. An e-reader provides a convenient format to store, transport, and view a large collection of digital content that would otherwise potentially take up a large volume of space in traditional paper format.

In some instances, e-readers are purpose built devices designed especially to perform especially well at displaying readable content. For example, a purpose built e-reader may include a display that reduces glare, performs well in high light conditions, and/or mimics the look of text on actual paper. While such purpose built e-readers may excel at displaying content for a user to read, they may also perform other functions, such as displaying images, emitting audio, recording audio, and web surfing, among others.

There also exists numerous kinds of consumer devices that can receive services and resources from a network service. Such devices can operate applications or provide other functionality that links the device to a particular account of a specific service. For example, e-reader devices typically link to an online bookstore, and media playback devices often include applications which enable the user to access an online media library. In this context, the user accounts can enable the user to receive the full benefit and functionality of the device.

With the rise of e-reader devices and other personal display devices, accommodating users with reading disabilities is of concern. According to the latest dyslexia research from the National Institutes of Health, dyslexia affects 20% of Americans and similar percentages apply worldwide. Generally, dyslexia is characterized by difficulty learning to read fluently and with accurate comprehension. Dyslexia involves visual attention deficit, which is an inability to concentrate on specific letters or words within lines of text. Another characteristic of dyslexia is visual crowding, an inability to recognize letters when scattered within a word.

DETAILED DESCRIPTION

Embodiments described herein include a computing device that provides enhancement features for use with reading activities by those individuals who have reading disabilities. In particular, examples described herein include a computing device that can operate to provide a dyslexic enhancement mode in which multiple dyslexic enhancement features can be provided to enhance the electronic reading environment of a user with dyslexia.

In an embodiment, text content from an e-book is displayed on the computing device. The computing device further provides a dyslexic enhancement mode. The dyslexic enhancement mode includes multiple dyslexic enhancement features that adjust the text content to facilitate an ability of the user with dyslexia to read the text content. Additionally, the computing device provides an interface to enable the user to enter input to select and/or specify values for individual dyslexic enhancement features. The computing device can configure implementation of the dyslexic enhancement mode based on the input provided by the user.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System and Device Description

Figure 1:
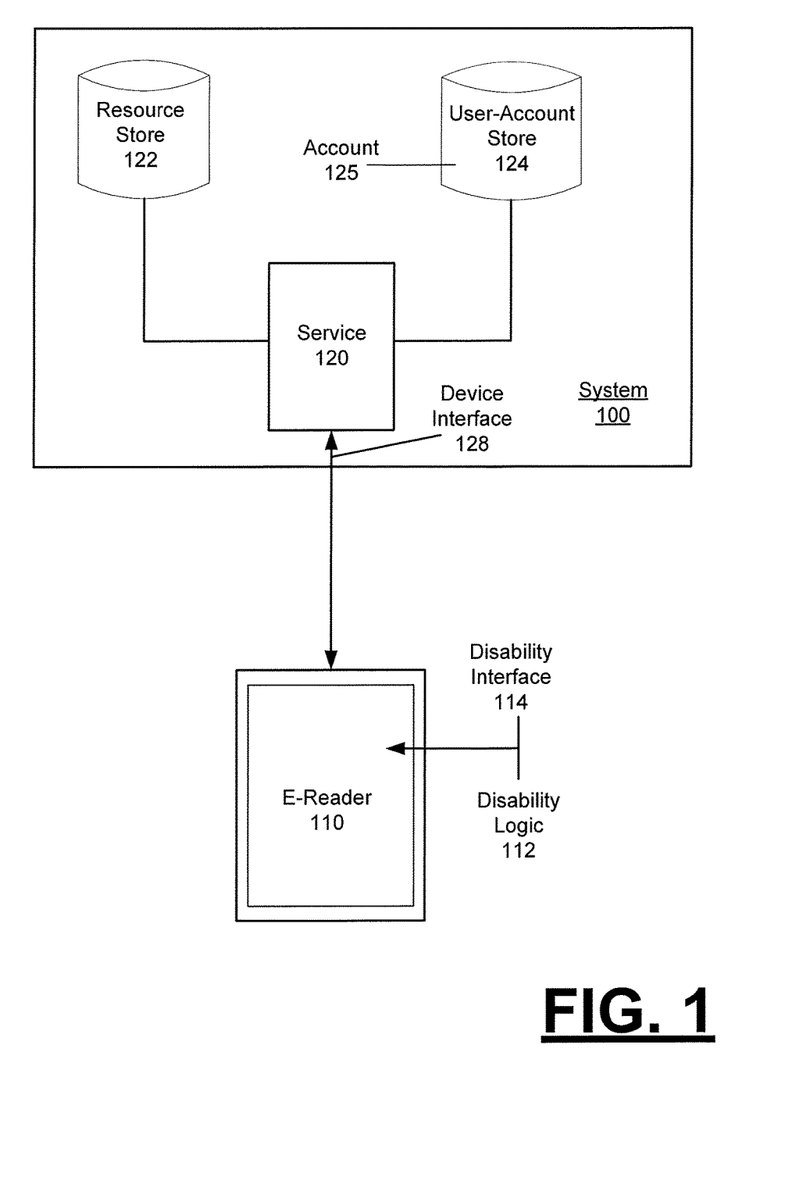
FIG. 1 illustrates a system for providing a disability enhancement mode for an e-reader device, according to an embodiment.

FIG. 1 illustrates a system for providing a disability enhancement mode for an e-reader device, according to an embodiment. In an example of FIG. 1, system 100 includes an electronic display device, shown by way of example as an e-reader device 110, and a network service 120. The network service 120 may include multiple servers and other computing resources that provide various services in connection with one or more applications that are installed on the e-reader device 110. By way of example, in one implementation, the network service 120 can provide e-book services which communicate with the e-reader device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reader device 110 can correspond to any electronic personal display device on which applications and application resources (e.g., e-books, media files, documents) can be rendered and consumed. For example, the e-reader device 110 can correspond to a tablet or a telephony/messaging device (e.g., smart phone). In one implementation, for example, e-reader device 110 can run an e-reader application that links the device to the network service 120 and enables e-books provided through the service to be viewed and consumed. In another implementation, the e-reader device 110 can run a media playback or streaming application which receives files or streaming data from the network service 120. By way of example, the e-reader device 110 can be equipped with hardware and software to optimize certain application activities, such as rendering of electronic content (e.g., e-books). For example, the e-reader device 110 can have a tablet like form factor, although variations are possible. In some cases, the e-reader device 110 can also have an E-ink display.

In additional detail, the network service 120 can include a device interface 128, a resource store 122 and a user account store 124. The user account store 124 can associate the e-reader device 110 with a user and with an account 125. The account 125 can also be associated with one or more application resources (e.g., e-books), which can be stored in the resource store 122. As described further, the user account store 124 can retain metadata for individual accounts 125 to identify resources that have been purchased or made available for consumption for a given account. The e-reader device 110 may be associated with the user account 125, and multiple devices may be associated with the same account. As described in greater detail below, the e-reader device 110 can store resources (e.g., e-books) that are purchased or otherwise made available to the user of the e-reader device 110, as well as to archive e-books and other digital content items that have been purchased for the user account 125, but are not stored on the particular computing device.

The e-reader device 110 can include disability logic 112, which provides settings and functionality that after text content with respect to a default mode in order to facilitate reading by individuals with a disability such as dyslexia. In particular, examples described herein implement functionality to after text content in a manner that enhances the reading experience of a user with a reading disability. For example, embodiments described herein recognize that dyslexic individuals can read with less difficulty when the electronic reading environment includes one or more of the following: (1) a background of light grey (not white) screen, for use with dark grey or dark colored text; (2) text in which wider spaces (relative to standard electronic publishing) are incorporated between characters and/or words; (3) text provided in sans serif font such as Arial, Comic Sans, Verdana, Tahoma, Century Gothic, Trebuchet or other font that is rounded rather than sharper; (4) text content that incorporates fewer words per line, such as with larger text size; (5) text content in which new sentences do not start near the edge of the line (e.g., separated from edge by 25% of line length); (6) text content without all capitalization and italics; and/or (7) text with bold. Accordingly, the disability logic 112 can include operations that generate a reading environment that accommodates some or all of the considerations for enhancing the reading experience of individuals with dyslexia. In one aspect, the e-reader device 110 is operable in a disability enhancement mode, in which functionality is provided to generate a reading environment that is better suited for the individual with the particular reading disability (e.g., dyslexia).

Embodiments further recognize that not all individuals with reading disabilities prefer or respond to the same electronic reading environment, but many (if not all) would have better reading experiences with functionality that adjusts the electronic reading environment in some form or another. In one aspect, the e-reader device 110 also implements a disability interface 114 to enable the individual to select functionality for accommodating reading disabilities of individuals.

In one implementation, the disability interface 114 is provided upon the user electing to operate the e-reader device in a dyslexic enhancement mode. The user selection can configure implementation of a dyslexic enhancement mode for the particular user by providing input through the disability interface 114. The input provided by the user can (i) specify which functionality is to be included to generate a desired electronic reading environment for the user, and (ii) specify values or parameters for functionality that is provided as part of the dyslexia enhancement mode (e.g., setting for shade of background, color or shade of text, size of letters, etc.). For example, the user may elect to have a grey background with text spacing being wider apart than the default setting. But other considerations, such as the presence of all capitalization, for example, can be ignored by user selection.

In a variation, the configuration for implementing the dyslexic enhancement mode can be in accordance with a default setting. The disability interface 114 can display functionality corresponding to implementation of the dyslexia enhancement mode in the default setting. From the interface, the user can (i) provide input that selects additional features for use with the dyslexia enhancement mode, (ii) provide input that un-selects features that are included as part of the default setting for the dyslexia enhancement mode; and/or (iii) specify values or parameters for dyslexic enhancement functionality that is provided as part of the dyslexia enhancement mode (e.g., setting for shade of background, color or shade of text, size of letters, etc.).

Hardware Description

Figure 2:
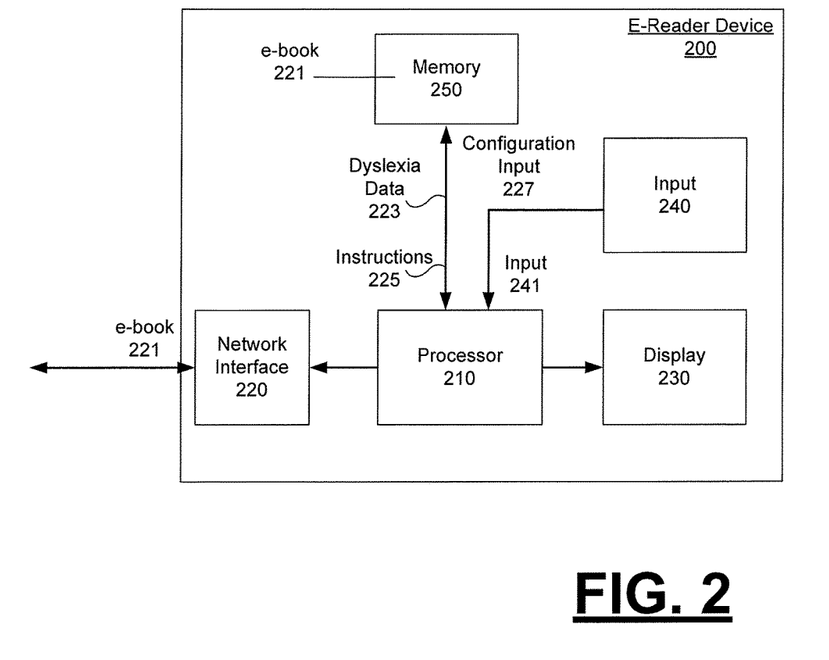
FIG. 2 illustrates an example of an e-reader device or other electronic personal display device, for use with one or more embodiments described herein.

FIG. 2 illustrates an example of an e-reader device or other electronic personal display device, for use with one or more embodiments described herein. In an example of FIG. 2, an e-reader device 200 can correspond to, for example, an e-reader device, such as also shown by e-reader device 110 of an example of FIG. 1. With reference to FIG. 2, e-reader device 200 includes a processor 210, a network interface 220, a display 230, one or more input mechanisms 240, and a memory 250.

The processor 210 can implement functionality using instructions stored in the memory 250. Additionally, in some implementations, the processor 210 utilizes the network interface 220 to communicate with the network service 120 (see FIG. 1). More specifically, the e-reader device 200 can access the network service 120 to receive various kinds of resources (e.g., digital content items such as e-books, configuration files, account information), as well as to provide information (e.g., user account information, service requests etc.). For example, e-reader device 200 can receive application resources, such as e-books 221 or media files that the user selects to purchase or otherwise downloads from the network service 120. The application resources that are downloaded onto the e-reader device 200 can be stored in the memory 250.

In some implementations, the display 230 can correspond to, for example, a liquid crystal display (LCD) or light emitting diode (LED) display that illuminates in order to provide content generated from processor 210. In some implementations, the display 230 can be touch-sensitive. In some variations, the display 230 can correspond to an electronic paper type display, which mimics conventional paper in the manner in which content is displayed. Examples of such display technologies include electrophoretic displays, electrowetting displays, and electrofluidic displays.

The processor 210 can receive input from various sources, including from input mechanisms 240 (e.g., buttons or switches, microphone, keyboard), the display 230 (e.g., soft buttons or keyboard) or other input mechanisms (accessory devices). In particular, processor 210 can receive a mode setting input 241 from the input mechanism(s), and respond by implementing a dyslexia (or other disability) enhancement mode. The processor 210 can retrieve dyslexia data 223 from the memory 250 in order to implement the dyslexia enhancement mode. The dyslexia data 223 can include instructions and or settings, corresponding to, for example, one or more of the following (collectively "dyslexia enhancement features"): (i) shade (e.g. gray) of background for text; (ii) shade or color of text; (iii) selection of a sans serif font type (from which the user can have options as to specific selection); (iv) setting to reduce the number of words that appear online, by marching the font size); (v) setting to reduce the number of instances that a sentence starts near an edge of the line (e.g., within 25% of the boundary of a line in text content; (vi) a setting that eliminates all capitalization text (e.g., replaces all capitalization text with no capitalization); (vii) a setting that illuminates italicized words; and (viii) a setting that renders words in bold.

The input 241 can trigger the processor 210 into implementing the dyslexia enhancement mode. Once implemented, the processor 210 can determine configurations for the dyslexia enhancement mode based on either a default setting, or a user configured setting. The configurations for the dyslexia enhancement mode can be based on user input provided through the disability interface 114. The memory 250 can store instructions 225 for generating the disability interface 114, and the processor 210 can output the disability interface via the display 230 in order to prompt the user to provide input for configuring implementation of the dyslexia enhancement mode.

In one implementation, the disability interface 114 is generated in response to the processor 210 determining that the dyslexia enhancement mode is to be implemented. In such an implementation, the user can preconfigure a dyslexia enhancement mode to their liking, before experiencing a reading environment under a default setting.

In a variation, the disability interface 114 is generated after the processor 210 implements a default dyslexia enhancement mode. The specific features of the default dyslexia enhancement mode can be listed to the user as an option through the disability interface 114. The user can then configure the dyslexia enhancement mode to their liking, and further compare the results with a default setting.

The processor 210 can record configuration input 227 provided by the user in response to viewing the disability interface 114. The configuration input 227 can correspond to selections and parameters. The selection input can identify specific dyslexic enhancement features that the user wants to incorporate for use with the dyslexia enhancement mode. The parameters can specify values or weights for implementing such features. For example, with respect to the background, the disability interface 114 can enable the user to select a shade and a darkness parameter. Likewise, the parametric input can enable the user to specify a particular font, a degree of spacing between characters and/or words, a size of lettering appearing each line, and/or the degree to which sentences are to start towards the middle of the line. This configuration input 227 can be stored in memory, and used to implement that dyslexia enhancement mode in subsequent instances when the device is operated. The disability interface 114 can be available to the user for subsequent reconfiguration and refinement as the user needs.

Figure 3:
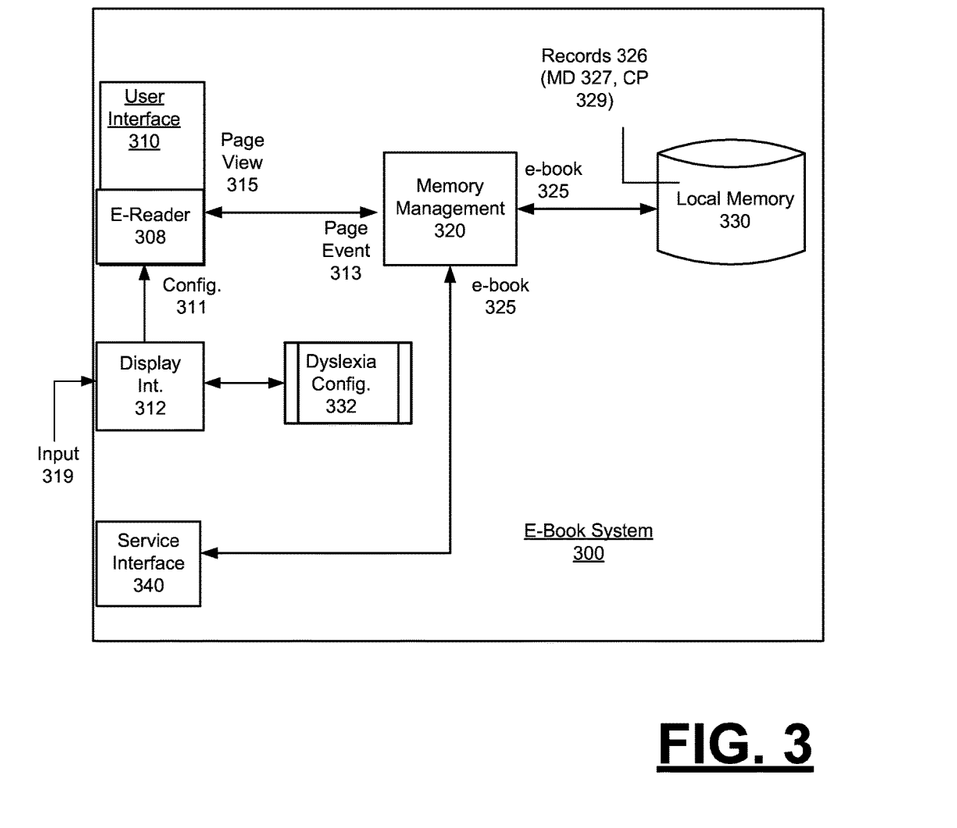
FIG. 3 illustrates an e-book device system for providing a disability interface and enabling a dyslexic enhancement mode for a user with a reading disability, according to one or more embodiments.

FIG. 3 illustrates an e-book device system for providing a disability interface and enabling a dyslexic enhancement mode for a user with a reading disability, according to one or more embodiments. In reference to FIG. 3, a system 300 implements programmatic components for communicating with an e-book service (such as network service 120, shown in FIG. 1), as well as for enabling functionality for viewing and accessing e-books utilized by an account associated with the e-reader device 110 (see FIG. 1 or FIG. 2). In some embodiments, the system 300 can be implemented as an application that runs on an e-reader device, such as shown with examples of FIG. 1 or FIG. 2.

In an example of FIG. 3, system 300 includes a user interface 310, a memory management module 320, a local memory 330, and a service interface 340. Some or all of the programmatic components shown with the computing system 300 can be provided in part as operating system-level components. Alternatively, the programmatic components shown with the computing system 300 can be provided as part of an application that runs on, for example, the e-reader device 110. For example, the user can download an application onto the device that is operated as the e-reader device 110, in order to obtain functionality such as described with an example of FIG. 3. For example, the user can download an application onto an e-reader device, to obtain functionality such as described herein as well as to communicate with the network service 120. Alternatively, an application can be embedded or otherwise preinstalled with other programmatic elements for providing functionality such as described with system 300.

The service interface 340 includes application logic which enables the e-reader device 110 to use, for example, a wireless Internet connection to connect to the network service 120 (see FIG. 1). In connecting with the service, the service interface 340 can transmit data that enables the network service 120 to identify the e-reader device 110 on which system 300 is implemented, so that the network service 120 can determine the account that is associated with the particular e-reader device. The service interface 340 can be used to retrieve e-books 325 from the network service 120. For example, in identifying the e-reader device 110 of system 300 to the network service 120, the network service may be able to procure payment information (e.g., stored credit card information) that can be used to charge the users account when the user purchases a new e-book from the service. Each e-book can correspond to a literary work having a pagination format. Optionally, some e-books may have chapter designations, as well as content that corresponds to graphics or images (e.g., such as in the case of magazines or comic books). Individual e-books 325 can also include metadata 327, such as imagery provided as a cover for the e-book when the e-book is marketed (e.g. similar to the manner in which a conventional hardbound book would be marketed in a retail store). In one implementation, the network service 120 can retrieve or otherwise identify the imagery and other metadata 327 of individual e-books from publisher sources.

In identifying the e-reader device of system 300, the network service 120 can identify what e-books belong to the account associated with the particular device. The e-books that are transmitted to the e-reader device of system 300 include those e-books that are purchased from the device, or those e-books that the user requested to download. In variations, e-books can be automatically downloaded to the device in response to occurrence of certain conditions. For example, the user can purchase an e-book on another device, and then subsequently connect to the network service 120 via the e-reader device 110 to automatically receive their previously purchased e-book. Alternatively, as another example, network service 120 can be configured to push e-books to the e-reader device 110 of system 300, based on, for example, user account settings, subscription plans and rules, and various other business logic considerations.

Additionally, the service interface 340 can include processes for automatically receiving updates from a network service 120. The update can include programmatic updates, including updates to software components on the e-reader device 110, as well as updates to lists, download of e-books that the user may have purchased on another device of the same account, recommendations from the network as to what a given user may want to purchase or view, and/or various other data that can be either generally provided to the user of the network service or specifically provided for to the particular account or user.

According to some embodiments, the local memory 330 stores each e-book as a record 326 that includes metadata 327 and content 329 (e.g., page content). The management module 320 can retrieve portions of individual e-books for purpose of rendering e-books via the user interface 310.

In an example of FIG. 3, the user interface 310 of e-book system 300 includes the e-reader component 308 and a disability interface 312. The e-reader component 308 operates to display content, corresponding to, for example, paginated content from an e-book. The e-reader component 308 can also permit interaction from the user, such as prompts or features for enabling the user to enter page events 313. Each page event 313 can correspond to the user transitioning from one phase to the next, or from one page by cluster to another, or transitioning from chapter to chapter. The e-reader component 308 can detect and respond to input that corresponds to page events 313. The memory management module 320 can receive page event 313, and update the paginated content 315 that the user views for the e-reader component 308 based on the page event 313, as well as based on the sequential structure of the content portion 329 of the e-book.

In the example provided, the disability interface 312 is specific to dyslexia, and operates to access features and settings corresponding to dyslexia configurations 332. The disability interface 312 can (i) use dyslexia configurations 332 to output a menu or list of possible selections and values that the user can incorporate in order to improve the user's reading environment when the dyslexia enhancement mode is implemented; and (ii) receive user input 319 that identifies the user's preference for configurations (e.g., selections of features, values for parameters for use with specific features etc.). The user input 319 can be used to derive a set of user-specific configuration 311.

The user-specific configuration 311 can be communicated to the e-reader component 308, which operates to be responsive to the configuration 311. In one embodiment, the e-reader component 308 implements the dyslexia enhancement mode upon receiving configurations 311 by the user, which are made by the user responding to the disability interface 312. By way of example, the e-reader component 308 can change the shading, darkness level or coloring of the background and/or text. In one implementation, the configurations 311 can specify values for the background shading and/or text coloring/shading. In another implementation, the configurations 311 can simply specify binary selection, corresponding to a setting that is predetermined (e.g., gray background and/or text).

As another example, the e-reader component 308 can be responsive to configurations 311 that specify values or selections to change the font, font size, or font format (e.g., from plaintext of bold). Still further, the e-reader component 308 can be operable, responsive to configurations 311, to find and replace all capitalization and/or italicized words with non-formatted text.

Still further, the e-reader component 308 can be configured to detect a value increase for character spacing, based on the configurations 311. The e-reader component 308 can increase spacing between individual characters and/or words based on a value specified in the configurations 311.

As another addition or variation, the e-reader component 308 can respond to configurations 311 that specify a preference to reduce the number of new sentences that start at the beginning or end of a line by scanning text content from a selected e-book 325 to detect punctuation periods and/or capitalized words that are indicative of the first word of a sentence. The e-reader component 308 can operate to insert spacing (including paragraph tabs or equivalents) to move the beginning parts of sentences inward along a line of text when such sentences appear near the beginning or end of the line of text (e.g., within 25% by linear dimension of the beginning or end of the line). Similarly, the reader can operate to increase the size of the paragraph tabs so that the first sentence of a new paragraph starts closer towards the center of the line.

Methodology

Figure 4:
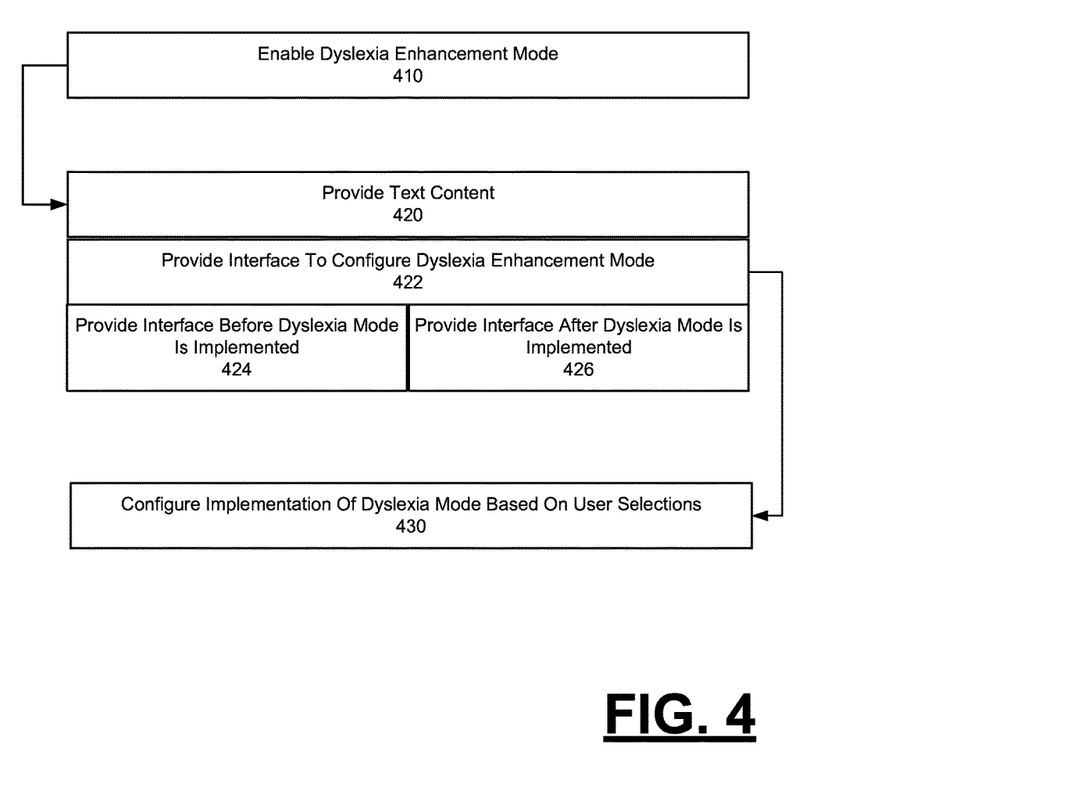
FIG. 4 illustrates a method for implementing a dyslexia enhancement mode on a e-reader device, according to one or more embodiments.

FIG. 4 illustrates a method for a dyslexia enhancement mode on an e-reader device, according to one or more embodiments. A method such as described by an example of FIG. 4 may be implemented using components such as described with an example of FIG. 1, FIG. 2 or FIG. 3. Accordingly, reference may be made to elements of prior examples for purpose of illustrating suitable components for performing a step or sub-step being described.

With reference to FIG. 4, an e-reader device 110 operates to enable a dyslexia enhancement mode (410), in which one or more dyslexia enhancement features are implemented to change an appearance of text content provided with, for example, an e-book, electronic magazines or comic books, etc. The dyslexia enhancement mode can be made operational in response to a user input. For example, the dyslexia enhancement mode may be available to the user through the settings menu of an e-reader device 110.

An e-reader device 110 can operate to provide text content (420). The text content can correspond to, for example, an e-book, electronic magazine, or electronic comic book. The dyslexia enhancement mode can be configured by input from the user, provided through, for example, disability interface 114. Accordingly, the disability interface 114 can be used to configure the dyslexic enhancement mode of the e-reader device 110 (422).

In one implementation, the disability interface 114 is provided before the dyslexia enhancement mode is implemented (424). For example, the user can select to have the dyslexia enhancement mode implemented on the e-reader device 110, and the disability interface 114 is displayed to the user upon the selection being made, but prior to any adjustments to text content being displayed to the user.

In a variation, the disability interface 114 is provided to the user after a default or predetermined dyslexic enhancement mode is implemented that alters text content provided to the user (426). For example, the user can select to implement a dyslexic enhancement mode on the e-reader device 110. In response to the user selection, text content can be displayed with the default set of settings, reflecting selections of dyslexic enhancement features and parametric values for such features. The disability interface 114 can prompt the user to subsequently alter the disability enhancement mode, such as by way of un-selecting and/or changing some of the dyslexic enhancement features to meet the user's preference.

EXAMPLES

Figure 5:
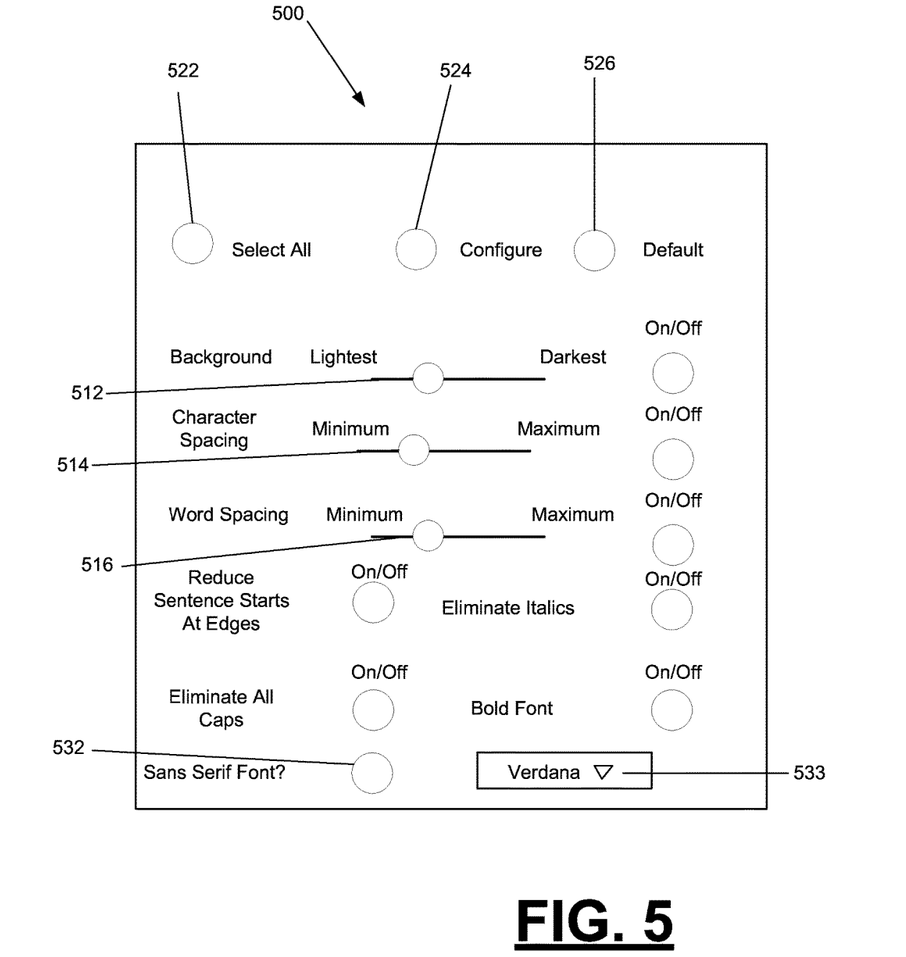
FIG. 5 illustrates an example of a disability interface according to an embodiment.

FIG. 5 illustrates an example of a disability interface according to an aspect. In particular, a display interface 500 can be provided on an e-reader device 110 (see FIG. 1). The display interface 500 can include a variety of features that enable the user to configure implementation of a dyslexic enhancement mode. The display interface 500 can provide the user with an option to select specific dyslexic enhancement features as part of implementing a dyslexic enhancement mode on an e-reader device. At least some of the features can be selectable to be either present or not. For example, adjusting background, adjusting character spacing, adjusting word spacing, reducing sentence starts at edges, eliminating all capitalization, eliminating italicized fonts, and formatting fonts in bold, are all examples of features that the user can select or unselect. Still further, some dyslexic enhancement features can be associated with parametric values. For example, the darkness or coloring of the background can be adjustable to user preference, using input feature 512 to select a parametric value. Likewise, features 514, 516 can provide for user input to adjust a degree of character spacing or word spacing between minimum and maximum values based on user input.

The disability interface 500 can also include a select all feature 522 to enable the user to select all dyslexic enhancement features to be turned on or otherwise present. Alternatively, the user can select feature 524 to individually turn on or off specific dyslexic enhancement features, as well as to select parametric values. As another variation, the user can select a default feature 526 in which some or all of the dyslexic enhancement features are selected by default (e.g., factory setting), with corresponding parametric values.

Additionally, the disability interface 500 can include a font selector 532. The font feature 532 can enable the user to specify text content to appear in sans serif font generally, so that selection of the feature results in a default sans serif font being used for the text content. As an addition or alternative, a font selector 533 (e.g., drop down menu) can enable the user to select a specific sans serif font.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
   memory resources to store an e-book and a set of instructions;
   one or more processors that access the memory resources to:
   display text content from the e-book in a default mode;
   receive an input electing to operate the computing device in a dyslexic enhancement mode;
   enable the dyslexic enhancement mode, the dyslexic enhancement mode including multiple dyslexic enhancement features that adjust the text content to facilitate an ability of a user with dyslexia to read the text content;
   display text content from the e-book in the dyslexic enhancement mode using a default set of dyslexic enhancement features;
   provide an interface to enable the user to enter input to select and/or specify values for individual dyslexic enhancement features, wherein the interface includes a setting to not display a beginning of a new sentence within an area of the text content that is located between an outer-most edge boundary of the text content and a half-way point between the outer-most edge boundary and a center of the text content, wherein the new sentence is within a paragraph and is not a first sentence at a beginning of the paragraph;
   configure implementation of the dyslexic enhancement mode based on the input provided by the user; and
   display text content from the e-book in the dyslexic enhancement mode using values for individual dyslexic enhancement features selected and/or specified by the user.

2. The computing device of claim 1, wherein the interface displays an option to display text on a grey and non-white background.

3. The computing device of claim 1, wherein the interface displays an option to widen spacing between at least one of characters or words.

4. The computing device of claim 3, wherein the option to widen spacing enables the user to select one of multiple possible values to increase spacing as compared to a default setting.

5. The computing device of claim 1, wherein the interface displays an option to enlarge characters of the text content or reduce a number of words that appear in a line of the text content.

6. The computing device of claim 1, wherein the interface displays an option to select a sans serif font type.

7. The computing device of claim 1, wherein the interface displays an option to eliminate or reduce words that appear in all capitalization or italics.

8. The computing device of claim 1, wherein the interface displays an option to display the text content in bold format.

9. A non-transitory computer-readable medium that stores a set of instructions, the set of instructions being executable by one or more processors to perform operations that include:
   display a text content from an e-book in a default mode;
   receive an input electing to operate in a dyslexic enhancement mode;
   enable the dyslexic enhancement mode, the dyslexic enhancement mode including multiple dyslexic enhancement features that adjust the text content to facilitate an ability of a user with dyslexia to read the text content;
   display text content from the e-book in the dyslexic enhancement mode using a default set of dyslexic enhancement features;
   provide an interface to enable the user to enter input to select and/or specify values for individual dyslexic enhancement features, wherein the interface includes a setting to not display a beginning of a new sentence within an area of the text content that is located between an outer-most edge boundary of the text content and a half-way point between the outer-most edge boundary and a center of the text content, wherein the new sentence is within a paragraph and is not a first sentence at a beginning of the paragraph;
   configure implementation of the dyslexic enhancement mode based on the input provided by the user; and
   display text content from the e-book in the dyslexic enhancement mode using values for individual dyslexic enhancement features selected and/or specified by the user.

10. The non-transitory computer-readable medium of claim 9, wherein the interface displays an option to display text on a grey and non-white background.

11. The non-transitory computer-readable medium of claim 9, wherein the interface displays an option to widen spacing between at least one of characters or words.

12. The non-transitory computer-readable medium of claim 11, wherein the option to widen spacing enables the user to select one of multiple possible values to increase spacing as compared to a default setting.

13. The non-transitory computer-readable medium of claim 9, wherein the interface displays an option to enlarge characters of the text content or reduce a number of words that appear in a line of the text content.

14. A method for operating a computing device, the method being implemented by one or more processors:
   displaying a text content from an e-book in a default mode;
   receiving an input electing to operate the computing device in a dyslexic enhancement mode;
   enabling the dyslexic enhancement mode, the dyslexic enhancement mode including multiple dyslexic enhancement features that adjust the text content to facilitate an ability of a user with dyslexia to read the text content;
   displaying text content from the e-book in the dyslexic enhancement mode using a default set of dyslexic enhancement features;
   providing an interface to enable the user to enter input to select and/or specify values for individual dyslexic enhancement features, wherein the interface includes a setting to not display a beginning of a new sentence within an area of the text content that is located between an outer-most edge boundary of the text content and a half-way point between the outer-most edge boundary and a center of the text content, wherein the new sentence is within a paragraph and is not a first sentence at a beginning of the paragraph;
   configuring implementation of the dyslexic enhancement mode based on the input provided by the user; and
   displaying text content from the e-book in the dyslexic enhancement mode using values for individual dyslexic enhancement features selected and/or specified by the user.

15. The computing device of claim 1, wherein a start of a new sentence is displayed a predetermined distance closer to the center of the page relative to other text displayed on the page, wherein the predetermined distance is 25% of a length of a line of text.

* * * * *

UNITED STATES PATENT AND TRADEMARK OFFICE
CERTIFICATE OF CORRECTION

PATENT NO. : 10,372,788 B2  
APPLICATION NO. : 14/170046  
DATED : August 6, 2019  
INVENTOR(S) : Benjamin Landau Page 1 of 1

It is certified that error appears in the above-identified patent and that said Letters Patent is hereby corrected as shown below:

On the Title Page

Item (57), Abstract, Line 6, delete "and I" and insert -- and/or --

In the Specification

In Column 4, Line 6, delete "after" and insert -- alter --

In Column 4, Line 10, delete "after" and insert -- alter --

In Column 5, Line 51, delete "and or" and insert -- and/or --

Signed and Sealed this  
Twenty-first Day of January, 2020

Andrei Iancu  
*Director of the United States Patent and Trademark Office*